(12) United States Patent
Miles

(10) Patent No.: US 8,701,410 B1
(45) Date of Patent: Apr. 22, 2014

(54) BALLISTIC IMPULSE TURBINE AND METHOD

(76) Inventor: Mark W. Miles, Atlanta, GA (US)

( * ) Notice: Subject to any disclaimer, the term of this patent is extended or adjusted under 35 U.S.C. 154(b) by 178 days.

(21) Appl. No.: 13/112,493

(22) Filed: May 20, 2011

(51) Int. Cl.
*F03B 7/00* (2006.01)
*F03G 3/04* (2006.01)

(52) U.S. Cl.
USPC .............................................. 60/639

(58) Field of Classification Search
USPC ............ 60/639, 39.01, 779, 645–681; 416/1, 416/171
See application file for complete search history.

(56) References Cited

U.S. PATENT DOCUMENTS

| | | | |
|---|---|---|---|
| 2,324,359 A * | 7/1943 | Callan | 446/24 |
| 4,167,367 A * | 9/1979 | Van Mechelen | 415/92 |
| 4,534,227 A * | 8/1985 | Petit | 73/861.87 |
| 6,644,062 B1 * | 11/2003 | Hays | 62/402 |
| 6,675,583 B2 * | 1/2004 | Willis et al. | 60/779 |
| 6,878,187 B1 * | 4/2005 | Hays et al. | 95/153 |
| 7,093,503 B1 * | 8/2006 | Hays et al. | 73/861.79 |
| 7,244,095 B2 * | 7/2007 | Hays | 415/84 |
| 2006/0133921 A1 * | 6/2006 | Hays | 415/84 |
| 2006/0202055 A1 * | 9/2006 | Klopp et al. | 239/103 |
| 2010/0111669 A1 * | 5/2010 | Hays et al. | 415/48 |

OTHER PUBLICATIONS

Welch, Phil et al., "New Turbines to Enable Efficient Geothermal Power Plants", GRC Transactions, vol. 33, 2009, 765-772.

* cited by examiner

*Primary Examiner* — Thomas Denion
*Assistant Examiner* — Brian Inacay
(74) *Attorney, Agent, or Firm* — Hahn & Moodley LLP; Vani Moodley, Esq.

(57) ABSTRACT

In one aspect, the invention provides a method for rotating an impeller device. Said method comprises (a) positioning at least one ejector tube to eject a working fluid onto the impeller device; (b) locating a kinetic droplet in an ejector tube; (c) introducing a charge of vapor into the ejector tube behind the kinetic droplet so that expansion of the vapor in the ejector tube causes the kinetic droplet to accelerate out of the ejector tube and to impinge on the impeller device; and (d) repeating steps (b) and (c) in a synchronized fashion.

13 Claims, 6 Drawing Sheets

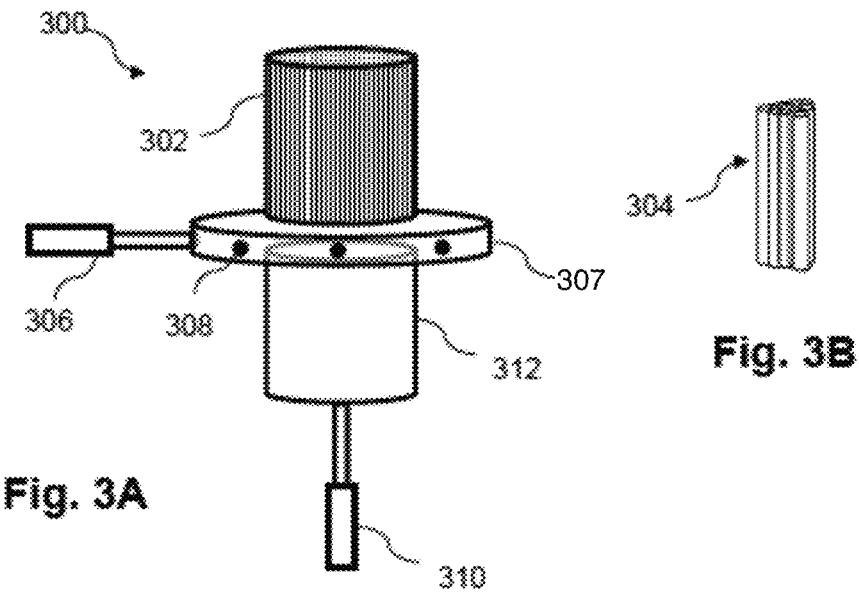
Fig. 3A
Fig. 3B
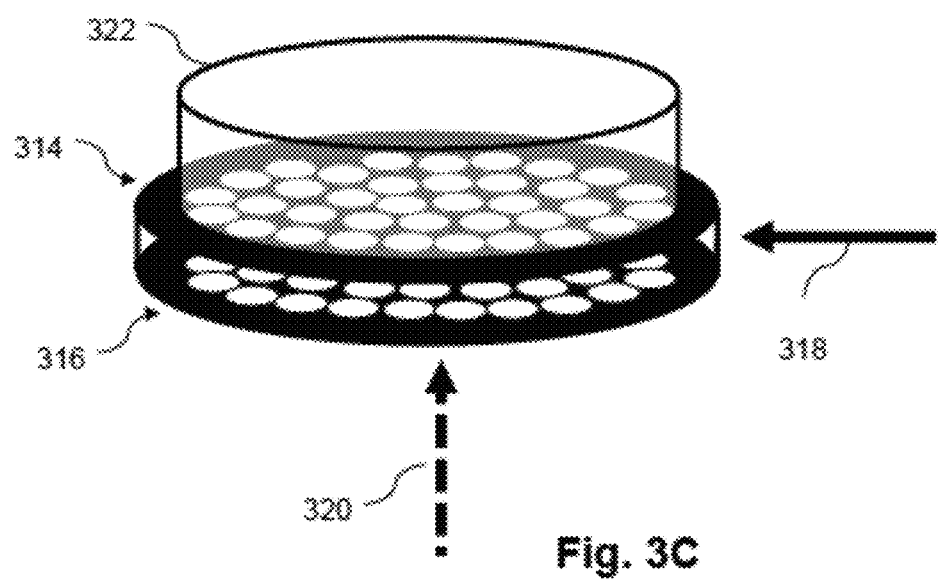
Fig. 3C

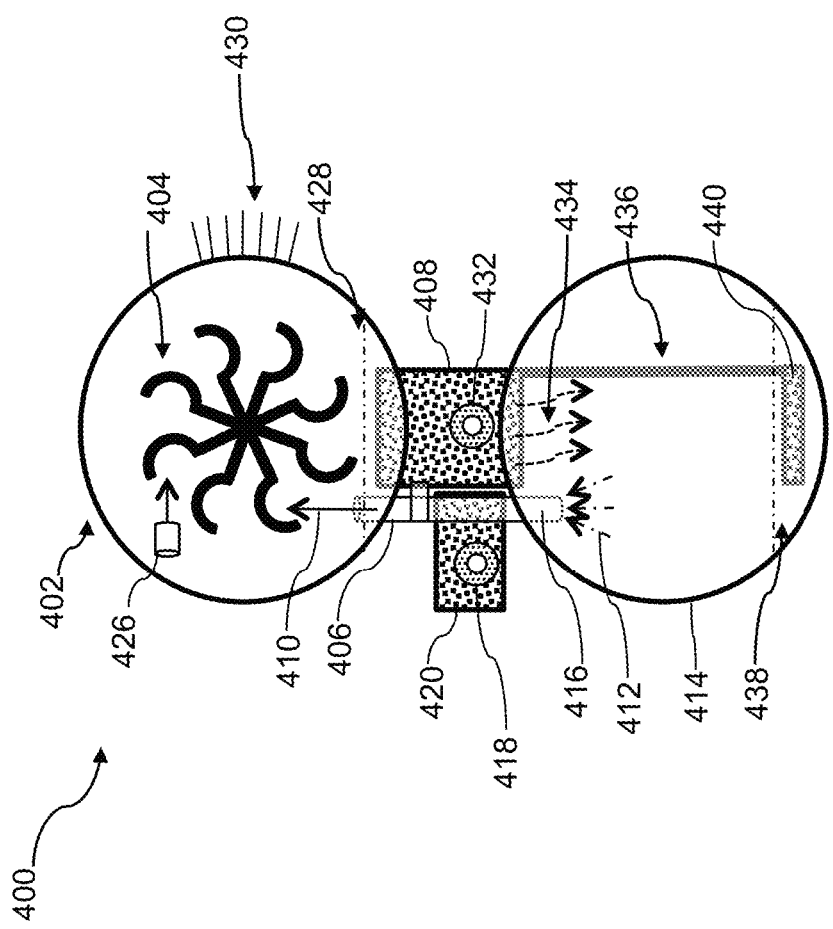

BALLISTIC IMPULSE TURBINE AND METHOD

FIELD

Embodiments of the invention relate to turbines.

BACKGROUND

Energy generation devices relying on the motive power of a fluid, nominally water, driven by an expanding vapor have been explored and developed for many decades.

Kershaw in U.S. Pat. No. 6,739,131 discloses a "Combustion-Driven Hydroelectric Generating System" which exploits the explosive force of expanding combustion gasses to drive a metered slug of liquid into a pressurized vessel. The liquid or gas within the vessel provides pressure to drive a stream of liquid that can be used to actuate a pelton wheel. The rotational mechanical energy of the pelton wheel is then converted to electricity.

Tobber in U.S. Pat. No. 4,201,049 similarly describes a method of using expanding combustion gasses to supply energy to a liquid which can subsequently drive a pelton wheel.

Domdey in U.S. Pat. No. 4,394,815 describes a "Turbo generator Using High Pressure Vapor", a device which utilizes high pressure vapor injected into an existing water current to transmit additional energy to the water. The stream is diverted towards a hydraulic turbo pump wherein its kinetic energy is converted into mechanical energy to be used for generating electricity.

Prueitt et al. in U.S. Pat. No. 7,021,900 also discloses using an external heat source to drive a boiler to produce heated vapor. The resulting vapor can be used to accelerate slugs of liquid the force of which can be used to pump fluids or drive a pelton wheel to generate electricity.

All of the aforementioned patents describe devices that are capable of delivering kinetic energy in the form of a moving fluid without the need for mechanical pistons or gearboxes. Disadvantageously, U.S. Pat. Nos. 6,739,131 and 4,201,049 require direct contact between the combustion products, the mechanisms for combustion (valves, ignition sources, etc.), and the liquid to be propelled. This makes for a complicated design for the combustor. The combustion products can also contaminate the propelled liquid which can degrade the performance of the engine by the gradual accumulation of undesirable compounds and residues.

Aforementioned U.S. Pat. Nos. 4,394,815 and 7,021,900 both use external sources of heat that eliminates the problems associated with combustion. In the former patent however, a source of constantly flowing water must be present and this limits the range of applications. In the latter patent, the design of a u-shaped "acceleration tube" and presence of a "check valve" limits the ultimate efficiency of the device. The geometry and size of the "acceleration tube" also limit the velocity of the fluid stream and the frequency with which it can be ejected.

All of the aforementioned approaches, with exception of U.S. Pat. No. 4,394,815, suffer from losses of energy due to the fact that the propulsive combustion products or vapors are not allowed to fully expand as they accelerate their respective liquid pistons. Useful energy is therefore given up to the environment.

SUMMARY

According to a first aspect of the invention, there is provided a method for rotating an impeller device, comprising:

(a) positioning at least one ejector tube to eject a working fluid onto the impeller device;

(b) locating a kinetic droplet in an ejector tube;

(c) introducing a charge of vapor into the ejector tube behind the kinetic droplet so that expansion of the vapor in the ejector tube causes the kinetic droplet to accelerate out of the ejector tube and to impinge on the impeller device; and (d) repeating steps (b) and (c) in a synchronized fashion.

According to a second aspect of the invention, there is provided method for rotating an impeller device, comprising:

(a) locating a plurality of separate kinetic droplets in a charging area;

(b) generating a pulsed shockwave to accelerate each Kinetic droplet from the charging area through a conduit that opens onto the impeller device thereby to cause the impeller device to rotate; and (c) repeating steps (a) and (b) in a synchronized fashion.

According to a third aspect of the invention, there is provided turbine system, comprising:

an impeller device mounted on an axle for rotation; and a ballistic ejector for rotating the impeller device, comprising, a loading system for loading at least one kinetic droplet in a loading area;

a barrel mechanism defining a conduit for each kinetic droplet from the loading area to the impeller device; and a tamping mechanism for tamping each kinetic droplet with a charge of vapor to cause ejection of said kinetic droplet form the loading area into the barrel mechanism.

According to a fourth aspect of the invention, there is provided an engine system, comprising:

an engine unit comprising a condenser module for condensing a vapor;

an impeller device housed within the condenser module and mounted for rotation by means of an axle;

a ballistic ejector for rotating the impeller device, comprising a loading system for loading at least one kinetic droplet in a loading area;

a barrel mechanism defining a conduit for each kinetic droplet from the loading area to the impeller device; and a tamping mechanism for tamping each kinetic droplet with a charge of vapor to cause ejection of said kinetic droplet form the loading area into the barrel mechanism;

a boiler module for heating a working fluid to produce the vapor;

a fluid pump for pumping the condensed vapor from the condenser module to the boiler module; and a heater for supplying heat to the boiler module; and a generator coupled to the engine unit.

Other aspects of the invention will be apparent from the detailed description below.

BRIEF DESCRIPTION OF THE DRAWINGS

FIG. 3 shows a schematic drawing of an ejector array, in accordance with one embodiment of the invention.

FIG. 4 shows an axial cross-sectional view of a ballistic impulse turbine engine, in accordance with one embodiment of the invention.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which maybe exhibited by some embodiments and not by others. Similarly, various requirements are described which may be requirements for some embodiments but not others.

Broadly, embodiments of the present invention disclose a method for driving/rotating an impeller device. The method is referred to herein as the "ballistic drive method" and includes propelling and forming a series of discrete kinetic droplets and ejecting the kinetic droplets with vapor pulses/charges at hi-speed to impinge on the impeller device whereupon the kinetic energy of the kinetic droplets causes the impeller device to rotate. Systems that use the ballistic drive method are also disclosed.

Figure 1:
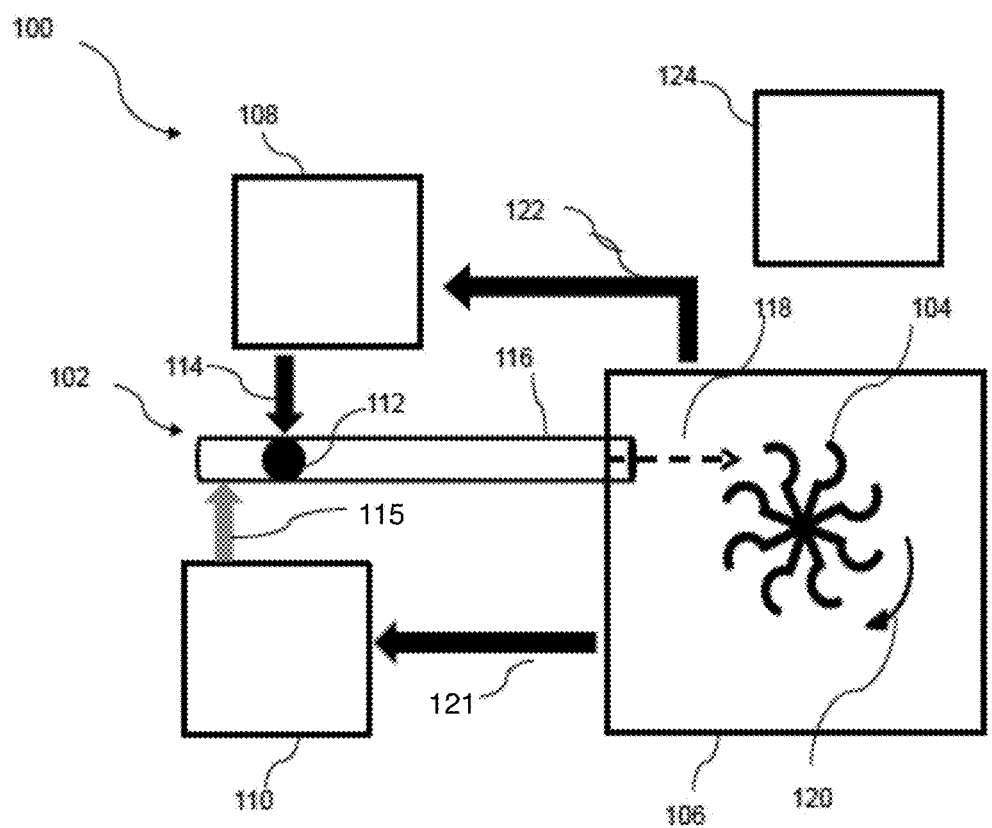
FIG. 1 shows a block diagram illustrating the major components of a ballistic impulse turbine engine, in accordance with one embodiment of the invention.

Referring to FIG. 1, a block diagram of a Rankine cycle engine 100 is shown, in accordance with one embodiment of the invention. The engine 100 includes a ballistic ejector 102 for ejecting a stream of hi-speed kinetic droplets onto an impeller device 104, housed in a condenser subsystem 106.

A fluid injection subsystem 108 and a vapor injection system 110 are configured to cooperate with the ballistic ejector 102 to produce the hi-speed stream of kinetic droplets, as will be described.

During operation, the fluid injection subsystem 108 introduces/locates a kinetic droplet 112 within the ballistic ejector 102. The process of introducing the kinetic droplets 112 into the ballistic ejector is indicated by the arrow 114. The kinetic droplets 112 comprise a working fluid. The working fluid may by comprise water, a refrigerant, or any one of a number of liquids or combination of liquids known by those skilled in the art for use in Rankine cycle engines.

The vapor injection subsystem 110 introduces a working fluid vapor as a series of discrete charges into an ejector tube 116 of the ballistic ejector 102. This process is depicted with arrow 115 in FIG. 1. An outlet of the ejector tube 116 in directed or focused on the impeller device 104. Each charge of vapor expands in the ejector tube 116 and effectively generates a pulsed shockwave that ejects a corresponding kinetic droplet from the ejector tube 116. Thus, a stream 118 of kinetic droplets is made to impinge on the impeller device 104 thereby causing it to rotate.

Each of the subsystems 108 and 110 include components that have not been shown so as not to obscure the invention. These components will be understood to form part of the subsystems 108 and 110 by one of ordinary skill in the art given the functions these subsystems have to perform. For example, one of ordinary skill in the art would understand these systems to include the necessary valves, conduits, and control means for the injection of volumes of working fluid in amounts and frequencies that can be controlled to a great degree of accuracy, and sensors that are capable of electronically transmitting the state of the subsystem including but not limited to characteristics such as temperature, fluid flow rate, and valve states.

In one embodiment, the fluid injection and vapor injection subsystems function in a synchronized fashion. A fluid pulse by the fluid injection subsystem 108 introduces a kinetic droplet into the ballistic ejector 102. The fluid pulse is followed by a vapor pulse by the vapor injection subsystem 110 introduces a charge of vapor into the ballistic ejector 102. Thus, a kinetic droplet is first put in position before the vapor is injected.

In one embodiment, the amount of injected fluid vapor is determined by the dimensions and thermodynamic characteristics of the ejector tube 116, and the kinetic droplet among other factors. The timing and frequency of the fluid and vapor pulses is determined by the operational speed of the engine 100 and its overall thermodynamic characteristics and desired energy output. Vapor pulse widths may be as short as tens of microseconds and pulse frequencies may be as high as tens of kilohertz or higher.

In one embodiment, the impeller device 104 may comprise a pelton turbine. Pelton turbines are one example of family rotary devices which extract energy from a moving fluid known as impulse turbines which include Turgo and Crossflow designs. Impulse turbines extract energy from a moving fluid by changing the velocity of the fluid. While the pelton turbine is incorporated into the concepts described in this specification, it should be noted that any form of impulse turbine, including but not limited to Turgo and Crossflow designs, may be utilized by making appropriate changes to the overall system design. As a consequence pelton turbine 104 rotates in a direction as indicated by arrow 120. The rotational energy of the pelton turbine can subsequently be converted to electrical energy if the turbine is coupled mechanically to an electric generator for the generation of electricity.

The condenser subsystem 106 includes other components such as valves, conduits, heat exchangers, pumps, an electric generator, and sensors which are capable of electronically transmitting the state of the subsystem 106 including but not limited to characteristics such as temperature, fluid flow rates, pelton turbine speed, and valve states, and power output. These other components have not been shown so as not to obscure the invention. However, these other components will understood by one of ordinary skill in the art to form part of the condenser system 106 given the that the overall the function of condenser subsystem is to convert the kinetic energy of the ejected kinetic droplet into electrical energy, condense the vapor which was used to eject the droplet, reject the resulting heat to the environment, and pump the required working fluids back to the vapor and fluid generation subsystems.

Arrows 121 and 122 represent the flow of working fluid from the condenser subsystem 106 back to the vapor and fluid generation subsystems 110,108, respectively.

A control subsystem 124 includes a micro-controller or a microprocessor type device and associated software, electronics, and electronic communication means. This subsystem is in electronic communication with all of the other subsystems allowing it to constantly monitor and control the state of all the engine subsystems. In this fashion, and relying on suitably designed software residing in the micro-controller, all of the functions of the engine may be synchronized and dynamically controlled such that the engine operates at maximum efficiency under a variety of energy inputs and output loads. Control subsystem 124 may respond to external commands and, with the proper interfaces installed, may be communicated with externally via a means such as the internet or wireless protocols so that its state and the state of the engine can be monitored and controlled from a remote location.

In general the system 100 derives improved efficiency and performance over alternative Rankine cycle engines due in part to similarities is shares with the positive attributes of other thermodynamic engines. A pelton turbine and a conventional bladed turbine, such as those used in steam power generation, are similar in that they are relatively simple mechanical devices and do not experience high rotational friction. Unlike conventional bladed turbines, a pelton turbine does not suffer from the same kinds of conversion losses. The pelton turbine is designed to extract energy from incompressible fluids, vs. compressible gasses in the bladed turbine. As a consequence energy which can be lost during the compression of the gas as it impinges on a conventional turbine blade, or as the gas slips past the blades of a conventional turbine, is now conserved. Conversion efficiencies of pelton turbines can exceed 95%.

The ballistic ejector 102 as a device is equivalent to a piston expander in an internal combustion engine. In this case the kinetic droplet 112 acts as the piston. In both the ejector tube 116 and the internal combustion piston it is difficult for the expanding gasses or vapor to slip past the piston, thus minimizing consequent losses. However the ejector tube 116 with the associated kinetic droplet offers significantly decreased losses due to friction between the kinetic droplet and the interior of the ejector tube. The decreased losses also allow for additional energy to be extracted during the expansion of the vapor allowing it to approach complete expansion.

Thus the engine 100 exhibits the best qualities of internal combustion and turbine based engines. It offers low frictional losses and the mechanical simplicity of a conventional bladed turbine, while minimizing losses due to gas compression and leaks, a primary attribute of internal combustion approaches.

Figure 2:
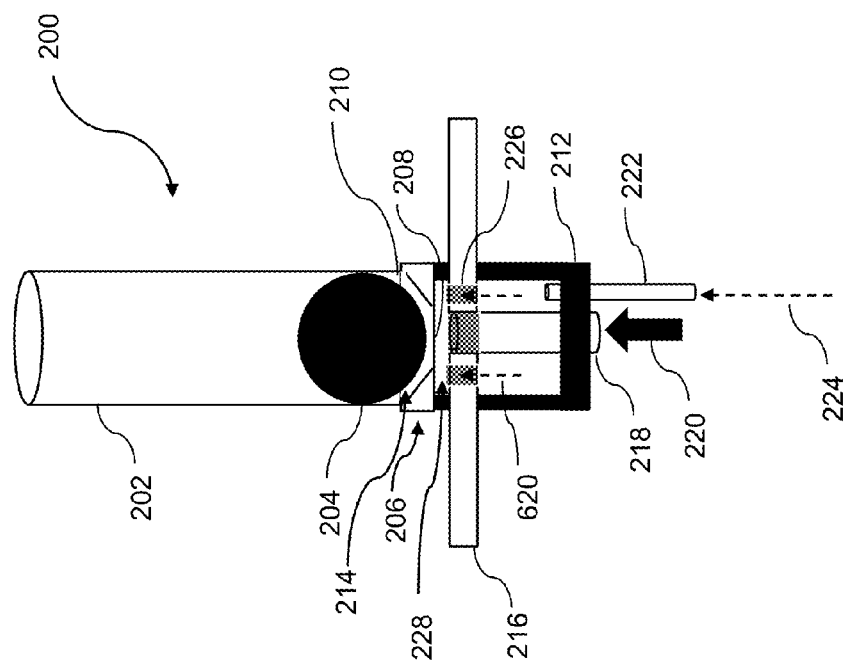
FIG. 2 shows schematic drawing of a single barrel ejector, in accordance with one embodiment of the invention.

The ballistic ejector 102 may be realized with different designs. One such design, known as a "single ejector assembly" is indicated by reference numeral 200 in FIG. 2 of the drawings. Referring now to FIG. 2, it will be seen that the ejector 200 includes an ejector tube 202. In use a kinetic droplet 204 is formed in the tube 202. The tube 202 may be a hollow cylinder with a diameter on the order of 5-10 mm or smaller. In one embodiment, the tube 202 may be machined from metal. In another embodiment, the tube 202 may be machined from a material with low thermal conductivity such as a ceramic or high temperature plastic. In both cases the characteristics of the interior surface of the tube 202 should have the potential to maintain a hydrophobic state to improve performance. In general the interior walls of the ejector tube should be designed to minimize friction between the walls and the kinetic droplet. Means for achieving this goal include various coatings including but not limited to Teflon, oxide coatings, and nitride coating. Additionally the interior surface may be etched, micromachined, or otherwise treated such that microscopic features or structures including but not limited to grooves, indentations, posts, or other regular or irregular features. Such features can also contribute to lowering frictional losses. Changes in the interior diameter of the tube in the form of tapers, undulations, or other geometries along the axis of the tube may also be incorporated so as to contribute to lowering friction and/or enhancing the formation of the kinetic droplet as it propagates and is ejected from the ejector tube. The overall diameter of the tube 202 is determined in large part by the material characteristics of the working fluid in use, especially the surface tension of the fluid. The surface tension of the working fluid affects the internal friction forces acting on kinetic droplet as it accelerates, among other characteristics. The surface tension also impacts the physical orientation of the ejector assembly 200 in that for a given value of surface tension a tube diameter which is too large will cause the fluid to be more subject to gravitational forces. Conversely reducing the diameter of the tube 202 can increase frictional effects thus reducing efficiency. For a working fluid such as R134a and an operational temperature of approximately 125° C., a diameter of 5 mm is the approximate maximum before orientation issues begin.

Ejector tube 202 is bonded to a cylindrical base 206 which provides entry and exit apertures 208 and 210, respectively. These apertures define a mechanism whereby fluids and vapor can propagate into the ejector tube 202, from an injection chamber 212. Reference numeral 214 indicates the interior of the base 206 between the apertures 208 and 210. The interior may be shaped and dimensioned to facilitate ejection of the kinetic droplets. In the case of embodiment shown in FIG. 2, the interior 214 is shaped to form a triangular nozzle though other shapes such as parabolas, hyperbolas, or other regular or irregular shapes may be utilized.

A support flange 216 provides a means of mounting the entire assembly and is mechanically bonded to vapor housing 212 forming a hermetic seal. A fluid conduit 218 passes through the vapor housing 212 to provide a means for incoming fluid 220 to enter the vapor housing 212 and ultimately the ejector tube 202. A vapor conduit 222 passes through the vapor housing 212, providing a means for incoming vapor 224 to propagate into the vapor housing 212 and ultimately into the ejection tube 202 via vapor ports 226. The vapor ports 226 are arranged symmetrically about an end of fluid tube 218, (the part of the tube which is closest to droplet 204), such that vapor is admitted uniformly into a mixing chamber 228.

During operation, a fixed amount of working fluid 220 is admitted into the ejection tube 202 via fluid tube 218 to form the kinetic droplet 204. The flow rate and amount of fluid are controlled by external valves and sources (not shown). After formation of the droplet 204, a pulse of vapor 224, is admitted into the vapor housing 212 via vapor tube 222, the rate and amount of which is also controlled by mechanisms not shown. The vapor housing 212 serves to make the pressure wave of the incoming vapor more uniform and there are many other geometries for the vapor housing and arrangements of one or more vapor tubes 222 which can accomplish this function. The vapor then passes through ports 226 where it is allowed to impinge upon the kinetic droplet in a way which is defined by the geometry of the nozzle between entry and exit apertures 208 and 210. Specifically the shape of nozzle defined by the interior space 214 determines to some extent the shape of the droplet, but also to some extent the shape of pressure wave which impinges on the droplet. It is this shape, along with temperature, velocity and other characteristics of the vapor stream, which help determine the stability of the kinetic droplet as it is accelerated.

All of the components for the ejector assembly 200 are made from materials which could include one or a combination of metals, metal alloys, high temperature plastics, and ceramics. The particular choice of a material for each of the components comprising the ejector is governed by the general desire to minimize thermal losses to the environment, tolerate expansion due to temperature cycling, resist erosion and degradation due to exposure to high temperatures, pressures, and the working fluid, and the need to function reliably for tens of years.

Another design for the ballistic ejector 102, known as an "ejector array" is indicated by reference numeral 300 in FIG. 3A of the drawings. The ejector array 300 includes an ejector tube array 302. The array comprises a plurality of ejector tubes which can best be seen in FIG. 3B where they are indicated by reference numeral 304. The ejector tubes form a densely packed array of tubes that are bonded together to form a tightly packed bundle. Individually the tubes are similar to and subject to the same constraints as the single tube 202. The individual tubes in the array 302 may have nozzles at their base that are similar in design to those described with respect to the single ejector assembly. By combining multiple tubes in a single array, an array of kinetic droplets may be ejected simultaneously thus delivering more kinetic energy than a single tube. A fluid source 306 supplies working fluid to a mixing chamber 307 via ports 308, which are distributed uniformly around the periphery of the mixing chamber 304. A vapor source 310 provides the vapor pulses required to drive the ejector array 302. A vapor housing 312 provides a means to make the flow of vapor from vapor source 310 more uniform.

The mixing chamber 304 is shown in greater detail in FIG. 3C. As will be seen the chamber 304 includes a two circular plates 314 and 316, which have been bonded together. The plates are perforated with a densely packed array of holes. The dimensions of the holes are determined by the operational conditions of the engine including but not limited to temperature, vapor and liquid pressures, and working fluid surface tension. With proper design the working fluid will form a meniscus at each of the perforations in plates 314 and 316, such that when fluid is admitted via ports 308, it fills the volume of the mixing chamber without flowing into the ejector tube array or the vapor housing. As such it acts as a natural capillary valve for the working fluid keeping it in position until a pulse of vapor is admitted. Alternative valve solutions include but are not limited to micromachined valves which actuate when sufficient pressure is applied by the vapor. The capillary forces must be kept to a minimum so that as little energy as possible is lost when the vapor pulse is admitted and subsequently forces the working fluid into the ejector tube array for acceleration. Arrows 320 and 318 illustrate the direction of vapor and liquid flow into the mixing chamber, respectively. In one embodiment, the dimensions and geometry of the holes on plates 314 and 316 may be different. With the perforated plate configuration it is possible to eliminate the ejector tube array and replace it with a single ejector tube 322 aligned with the periphery of the hole array. The capillary forces caused by the perforations eliminates the ejector orientation issues, while the use of a single tube reduces the amount of friction encountered by the ejected droplets.

The components for the ejector array may be made from materials which could include one or a combination of metals, metal alloys, high temperature plastics, and ceramics. The particular choice of a material for each of the components comprising the ejector array is governed by the general desire to minimize thermal losses to the environment, tolerate expansion due to temperature cycling, resist erosion and degradation due to exposure to high temperatures, pressures, and the working fluid, and the need to function reliably for tens of years.

While the general geometry of the ejector tubes shown in FIGS. 2 and 3 are cylindrical, it should be noted that alternative shapes, rectangular or hexagonal among others, may be utilized depending on the kind of manufacturing process utilized as well as the required fluidic behavior of the ejector tube.

Referring now to FIG. 4, reference numeral 400 generally indicates an integrated ballistic impulse turbine engine, in accordance with one embodiment of the invention. The engine 400 includes a condenser module 402. The condenser module 402 is a cylindrical component made of metal or a suitable metallic alloy which is rugged enough to endure exposure to the environment and can be hermetically sealed. A pelton turbine 404 is mounted for rotation within the condenser module 402 about an axis perpendicular to the plane of the drawing. The condenser module 404 includes a number of paddles (eight in the case of the embodiment shown). The mounting structure for the pelton turbine 404 is not shown. The body of the condenser module 402 may be coupled to an ejector assembly 406 and fluid pump/heat block 408. The components 406 and 408 pass through the walls of condenser module 402 while maintaining the hermeticity of the module. As described above with reference to FIG. 1, kinetic droplets 410 are ejected by the ejector 406 to impinge upon the pelton turbine 404. The ejector 406 may be similar in function and design to one of those already described with reference to FIGS. 2 and 3.

The ejector assembly 406 includes the necessary valves, electronic control systems, and fluidic connections to a vapor supply and fluid supply. The ejector assembly 406 is driven by vapor 412 supplied by a boiler module 414. This vapor may be superheated by optional superheater 420, which is supplied with heat from heat source 418. Heat source 418 may be in the form of a heat pipe, or fluid conduit carrying a heat transfer medium. The superheater 418 is in good thermal contact with the ejector 406.

The pelton turbine, or pelton wheel, is a well-known form of impulse turbine for converting kinetic energy of a flowing liquid into rotational mechanical energy. While the specific design of the paddle geometry is well documented in the art, the number of paddles incorporated into the engine, and overall diameter of the turbine will depend on a number of variables. These include the operational frequency of the ejectors, the number of ejectors, and the velocity of the kinetic droplets, among others. Ejector 426 is shown to illustrate the fact that additional ejectors may be coupled to the engine at appropriate orientations and positions about the arc pelton turbine, and with suitable internal connections to provide control signals, vapor and working fluids. Additional ejectors enable more kinetic energy to be applied to the pelton turbine in a given amount of space. They also provide one means for modifying the amount of torque applied to the wheel as the may be energized simultaneously, individually, or in a sequence depending on such factors as the number of paddles in the turbine, the rotational speed of the pelton turbine, and the electrical load on the engine among others.

The expended kinetic droplets are collected at the bottom of the condenser module 402 where they form a pool whose level is indicated by level 428. The vapor which drives the kinetic droplets is condensed on the interior of the condenser module 402 by virtue of the module being cooled, and also collects in fluid form in the aforementioned pool. This pool is the source of working fluid for ejector 406. Cooling is accomplished by mounting a radiator 430, on the exterior of the condenser module 402 so that good thermal contact is made between the radiator 430 and the condenser module 402. The interior walls of the condenser module 402 can thus be kept sufficiently cool by rejecting heat to the atmosphere, or some other heat sink, and the resulting condensate also collects in the bottom of the condenser.

Figure 5:
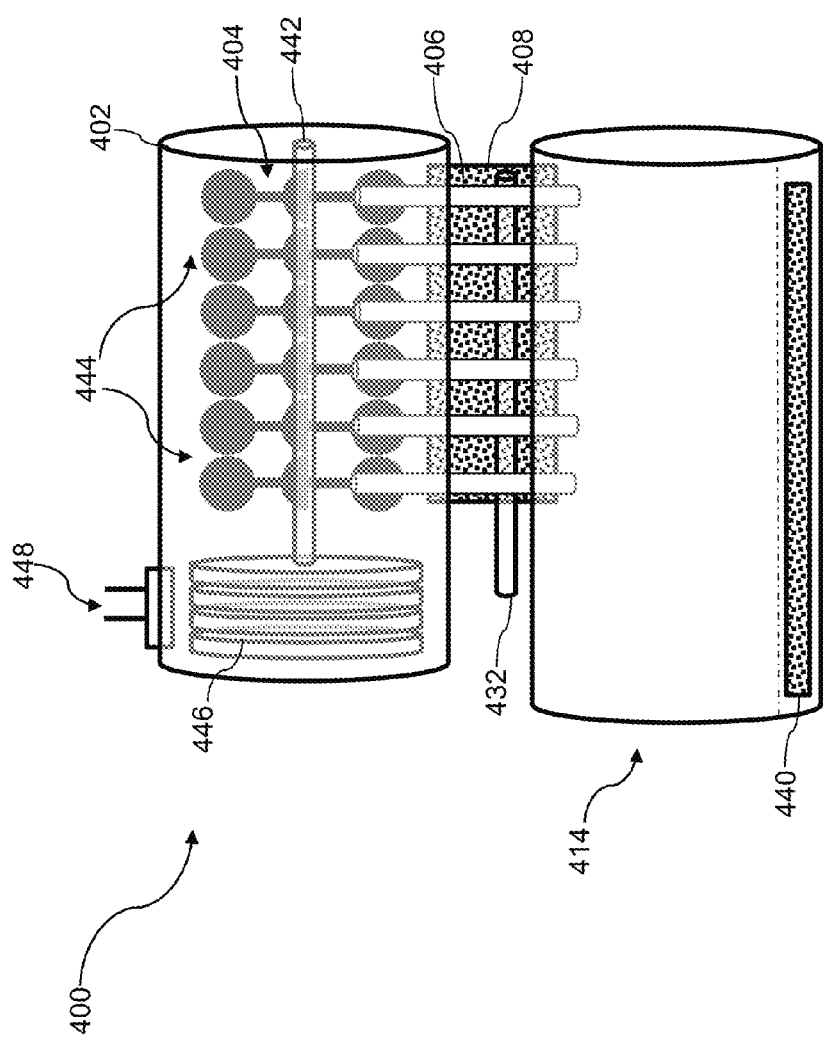
FIG. 5 shows a side view of the ballistic impulse turbine engine, of FIG. 4.

Fluid pump/heater block 408 performs the function of pumping fluid from the condenser module 402 into the boiler module 414 and the ejector assembly input 416, as well as supplying heat to the boiler module 414. Ejector assembly 416 provides fluid droplets to ejector 406. Heat from an external heat source is supplied to the heat block 408 via heat conduit 432. Fluid pumping by the fluid pump/heat block may be provided by an electrically or mechanically driven pump of the sort used in many heat transfer applications. It may also be provided passively via a porous structure whose porosity and internal cell size are such that a pressure difference can be sustained across the structure while fluid is pumped via the application of heat to the porous pumping structure. Heat may be transmitted to the heat block via single phase or two-phase fluid transport with the appropriate conduits 432 put in place. Fluid can enter the boiler 414 in the form of vapor or mixed fluid/vapor stream 434 which is produced by the fluid pump/heat block 408. Heat can enter the boiler 414 via conduction to the boiler walls. Heat can also enter the boiler 414 via convection into the holier, in part via stream 434. Heat may also enter the boiler 414 through working fluid pool 438 which resides at the bottom of the boiler module 414. This is accomplished by conducting heat from the heat block 408 to pool heater 440 via heat coupler 436. The boiler module 414, in one embodiment, may be a cylindrical construct made from a metal, metallic alloy, or some other material capable of maintaining hermeticity under high internal pressures and temperatures. It is insulated so as to minimize the loss of heat through its walls to the environment Referring now to FIG. 5, there is shown a side view of the engine 400. As will be seen, supporting axle 442, is shown and is the member that provides mechanical support for pelton turbine 404 and defines a low friction axle around which the turbine can rotate. The structure which supports the axle is not shown but can be realized in many different configurations. The pelton turbine 404 is shown to have multiple paddle sections 444. A paddle section 444 in this case is a single array of paddles arranged symmetrically around the rotational axis of the pelton turbine 404. Six paddle sections are shown in this case though the number may be higher or lower depending on the desired characteristics of the engine. Each paddle section is associated with an ejector and the number of ejectors in an engine is greater than or equal to the number of paddle sections. As indicated above there may be more than one ejector per paddle section.

The engine 400 also includes an electric generator 446. The generator 446 may be attached to the rotational axle 442 such that the mechanical energy imparted to the axle by the pelton turbine 404 can be converted into electrical energy. In one embodiment the generator 446 is mounted internally though external configurations are also feasible. An externally mounted generator could be coupled to the axle 442 via a magnetic coupling for example or via sealed bearings. In the internally mounted case the generator may be of a modified form or shielded in such a way as to make it substantially immune to exposure to the working fluid within the condenser module. This has the advantage of precluding the need for a rotating hermetic feed through the wall of the condenser module to provide mechanical coupling between the internal rotating axel and an externally mounted generator. An internally mounted generator would limit the number of feedthroughs to a single stationary electrical feedthrough 448. Feedthrough 448 would provide all of the electrical connections between the internal components such as the generator, valves, sensors, etc. and the control and support components external to the condenser housing.

As mentioned earlier, in one preferred embodiment a single working fluid could be selected from a variety of working fluids including but not limited to water, refrigerants such as ammonia, r245a and r134f, fluids such as pentane, or other fluids or combinations of fluids. One such combination could include ammonia and water which can be combined to create a single fluid with the specific percentages of each defined by the nature of the heat source among other factors.

Figure 6:
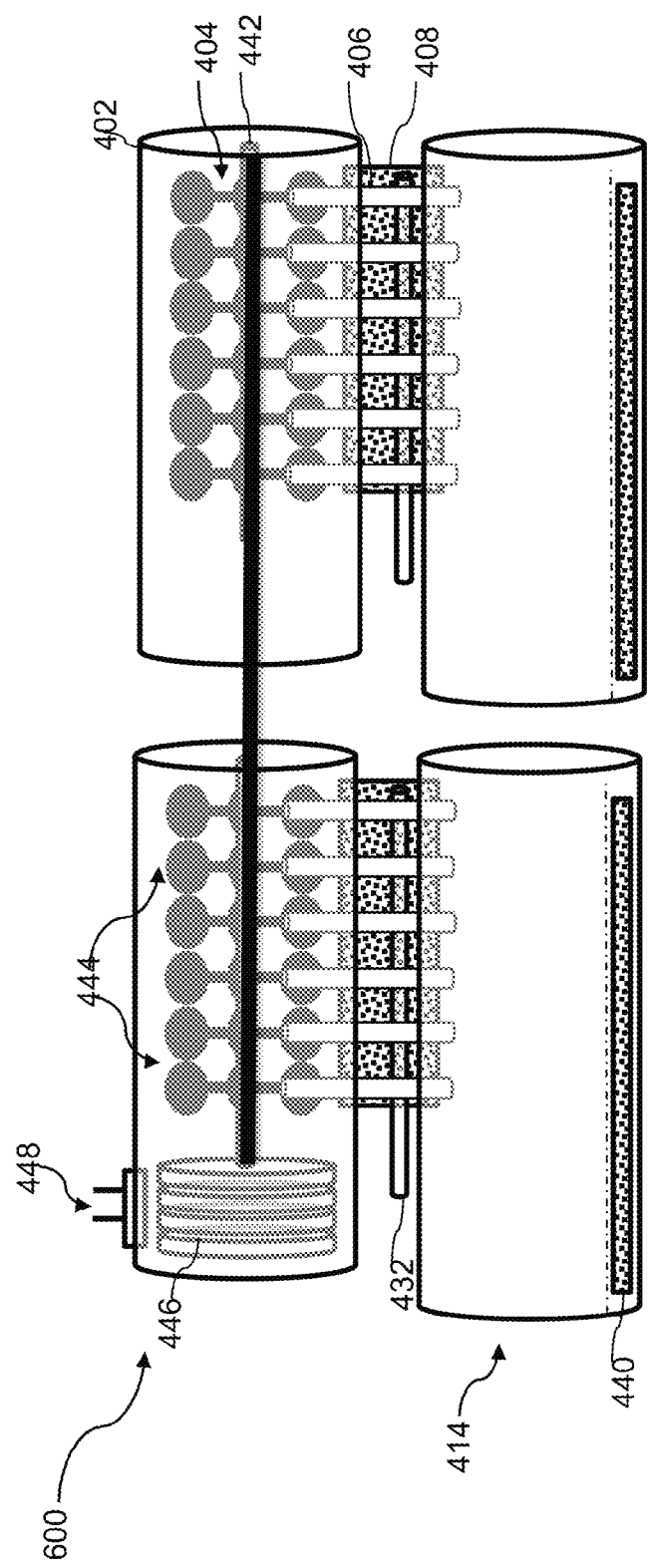
FIG. 6 shows a side view of a ballistic impulse turbine engine with two engines, in accordance with one embodiment of the invention.

Referring again now to FIG. 5, it is possible to replicate all of the components of the engine portrayed in the figure except for the generator 446 and feedthrough 448. Thus, two or more separate engines could be connected via an extended axle 404, by incorporating the required rotating hermetic seals or perhaps via magnetic coupling. Such an embodiment is shown in FIG. 6 of the drawings where it is indicated by reference numeral 600. The radiator from one engine could then be used to supply heat to the other engine. In this way it would be possible to utilize two separate working fluids with operating temperatures optimized so that one engine could act as a bottoming cycle for the other. The term bottoming cycle refers to a thermodynamic cycle whose operating temperature allows it to generate heat from the rejected heat of another thermodynamic cycle. In this way the overall efficiency of the combined engines could be increased without doubling the number and cost of certain additional components.

The Ballistic Impulse Turbine Engine (BIT) can be utilized in any number of applications where a heat source is converted into mechanical or mechanical and subsequently electrical energy. These form units for using a heat source to provide rotational mechanical drive to a pump or compressor, or units to provide a source of electricity ranging in size from 100's of watts to 100's of kilowatts or more. The ability to utilize different working fluids with differing thermodynamic properties makes possible the use of heat sources of different quality ranging from geothermal sources with output temperature flows of less than 100° C. to fossil fuel driven sources with output temperatures exceeding 500° C. The potential for lightweight and relatively simple design could enable stationary engines for fixed power plant applications, as well as mobile engines for vehicles for ground, water, and air transport. The fact that the thermodynamic efficiency of the engine does not vary much with the size of the size of the impulse turbine enables electric power generating systems comprising arrays of BDTs, the composition of which can be easily customized to the capacity of the thermal source. The redundancy of such systems would make them more immune to damage and easier to maintain without compromising power output.

Although the present invention has been described with reference to specific example embodiments, it will be evident that various modifications and changes can be made to these embodiments without departing from the broader spirit of the invention. Accordingly, the specification and drawings are to be regarded in an illustrative sense rather than in a restrictive sense.

What is claimed is:

1. A turbine system, comprising:
   an impeller device mounted on an axle for rotation; and
   a ballistic ejector for rotating the impeller device, comprising
   a loading system for loading at least one kinetic droplet in a loading area;
   a barrel mechanism defining a conduit for each kinetic droplet from the loading area to the impeller device; and
   a tamping mechanism for tamping each kinetic droplet with a charge of vapor to cause ejection of said kinetic droplet form the loading area into the barrel mechanism.

2. The turbine system of claim 1, further comprising a control mechanism to synchronize the loading and tamping of the kinetic droplets.

3. The turbine system of claim 1, wherein the loading area comprises a plurality of formation sites each site defining a structure shaped and dimensioned for forming a kinetic droplet thereon.

4. The turbine system of claim 3, wherein the barrel mechanism defines a single conduit and the plurality of formation sites feed into said single conduit.

5. The turbine system of claim 3, wherein the barrel mechanism defines a plurality of conduits, and each formation site feeds into a corresponding conduit.

6. The turbine system of claim 1, further comprising a plurality of ballistic ejectors, each configured to eject kinetic droplets onto a different part of the impeller device.

7. An engine system, comprising:
   an engine unit comprising
   a condenser module for condensing a vapor;
   an impeller device housed within the condenser module and mounted for rotation by means of an axle;
   a ballistic ejector for rotating the impeller device, comprising
   a loading system for loading at least one kinetic droplet in a loading area;
   a barrel mechanism defining a conduit for each kinetic droplet from the loading area to the impeller device; and
   a tamping mechanism for tamping each kinetic droplet with a charge of vapor to cause ejection of said kinetic droplet form the loading area into the barrel mechanism;
   a boiler module for heating a working fluid to produce the vapor;
   a fluid pump for pumping the condensed vapor from the condenser module to the boiler module; and
   a heater for supplying heat to the boiler module; and
   a generator coupled to the engine unit.

8. The engine system of claim 7, wherein the engine unit comprises a plurality of ballistic ejectors configured to eject kinetic droplets onto a different portion of the impeller device.

9. The engine system of claim 7, further comprising a plurality of engine units, each coupled to the generator.

10. The engine system of claim 9, wherein the impeller devices of each engine unit is mounted for rotation by means of a common axle.

11. The engine system of claim 10, further comprising a single feedthrough.

12. The engine system of claim 7, wherein the impeller device is a pelton turbine.

13. The engine system of claim 7, wherein the fluid pump and the heater are integrated into a single unit that is hermetically sealed with the boiler module and the condenser module.

* * * * *